United States Patent [19]
Console et al.

[11] 3,987,018
[45] Oct. 19, 1976

[54] CONTINUOUS PROCESS FOR THE PREPARATION OF ACRYLONITRILE POLYMERS AND COPOLYMERS

[75] Inventors: Luciano Console, Mirano; Enzo Chiellini, Rosignano Solvay; Benedetto Calcagno, Milan, all of Italy

[73] Assignee: Societa' Italiana Resine S.I.R. S.p.A., Milan, Italy

[22] Filed: July 8, 1974

[21] Appl. No.: 486,738

[30] Foreign Application Priority Data

July 6, 1973 Italy ................................ 26267/73

[52] U.S. Cl. ........................... 526/342; 260/47 UA; 260/63 UY; 260/79.3 M; 526/65; 526/173; 526/225; 526/227; 526/321

[51] Int. Cl.[2] ................. C08F 120/44; C08F 220/44

[58] Field of Search ................. 260/85.5 R, 85.5 M, 260/85.5 F, 85.5 D, 85.5 P, 88.7 R, 88.7 C, 88.7 D, 88.7 G

[56] References Cited

UNITED STATES PATENTS

| | | | |
|---|---|---|---|
| 2,475,016 | 7/1949 | Johannes de Nie | 260/88.7 G |
| 2,750,357 | 6/1956 | Bredereck et al. | 260/88.7 D |
| 3,065,212 | 11/1962 | Milford et al. | 260/85.5 R |
| 3,174,954 | 3/1965 | Nakayama et al. | 260/85.5 R |
| 3,479,312 | 11/1969 | Fujii et al. | 260/85.5 D |
| 3,635,927 | 1/1972 | Johnston | 260/85.5 M |

*Primary Examiner*—Harry Wong, Jr.
*Attorney, Agent, or Firm*—Sughrue, Rothwell, Mion, Zinn and Macpeak

[57] ABSTRACT

A continuous process for polymerizing acrylonitrile monomer or copolymerizing a mixture of acrylonitrile monomer and a further ethylenically unsaturated monomer copolymerizable therewith in an aqueous medium and in the presence of a catalytic redox system through a primary and a secondary polymerization step. The primary step is carried out in a plurality of independent distinct reaction zones connected in parallel and operated under similar conditions, in which the conversion of the monomer or mixture of monomers is maintained at a value not exceeding 70%. The secondary step is carried out in a single reaction zone connected in series with each of the primary zones. The conversion of the monomer or mixture of monomers in the secondary zone is maintained at a value not exceeding 80% with respect to the overall feed of monomer or mixture of monomers to the primary zones.

14 Claims, No Drawings

CONTINUOUS PROCESS FOR THE PREPARATION OF ACRYLONITRILE POLYMERS AND COPOLYMERS

BACKGROUND OF THE INVENTION

1. Field Of The Invention

The invention relates to a continuous process for preparing acrylonitrile polymers or copolymers particularly suitable for processing into fibers.

2. Description Of The Prior Art

It is known that polyacrylonitrile or acrylonitrile copolymers containing the former in a proportion of 85% by weight at least, are widely used in the art, more particularly for producing fibers.

These polymers are prepared in the art by polymerization of acrylonitrile or by copolymerization of acrylonitrile with one or more ethylenically unsaturated compounds copolymerizable therewith in the presence of suitable catalysts, the process being normally carried out in an aqueous medium.

More particularly, known polymerization catalysts are peroxide compounds generally, such as benzoyl peroxide and alkali metal or ammonium persulphates, or combinations of these compounds with a substance of a reducing character, the combinations being known as redox systems. In the continuous operation of polymerization processes the constituents of the catalytic system, monomers and aqueous reaction medium are continuously fed to a reactor in which the reaction mass is stirred and kept at a controlled temperature. A polymer slurry is continuously discharged from the polymerization reactor, the unreacted monomers and, subsequently, the polymer being separated from the said slurry. The polymer is subjected to washing and drying treatments.

Since the periods of residence under polymerization conditions are purely statistical, operating with a plurality of reactors in series is generally preferred.

Normally, polymerization is carried out in two reactors in series, a conversion as high as possible of the monomer being effected in the former one, final conversion being then adjusted to the desired extent in the latter one acting as a finishing reactor.

As is known, the properties of the fibers obtained from polymers or copolymers of acrylonitrile depend upon the properties conferred to the polymers, such as molecular weight, distribution of the molecular weights, structure, etc.

Attempts have been made in the art at influencing the properties of the polymers either by selecting the catalytic system, or, above all, by adjusting the reaction parameters.

In the processes carried out in two polymerization steps in series, different values of the reaction parameters are normally maintained during the two steps, such as pH and temperature values, in order to influence the properties of the acrylonitrile polymers.

Moreover, as stated above, the prior art teaches adjusting conditions so as to effect at the first step conversion of the monomer as high as possible, the conversion being maintained within relatively moderate limits at the second polymerization step.

This procedure is not free from drawbacks, in that a relatively high number of parameters at a plurality of polymerization steps are not readily influenced.

Moreover, with these processes, acrylonitrile polymers of fully satisfactory properties cannot be obtained.

In commercial plants for preparing very high quantities of acrylonitrile polymers, a plurality of production lines are normally employed, because for practical reasons the capacity of the containers suitable for the polymerization reaction is limited.

However, both for economic reasons and for the sake of a more constant character of the properties of the polymers, one line of production only is desirably operated.

Finally, in an industrial process, adjustment of the quantity of the polymer produced is desirable or, in other words, the productive capacity of the polymerization plant should be varied according to particular requirements.

In known processes an adjustment of this kind is not easily obtained or, at least, the polymer production cannot be varied without causing at the same time unbalances and undesirable variations in the polymerization plant.

SUMMARY OF THE INVENTION

The present invention relates to the polymerization of acrylonitrile and copolymerization of acrylonitrile with further ethylenically unsaturated monomers copolymerizable therewith, by a continuous process which avoids the inherent drawbacks of the prior processes or, at least, substantially reduces them, and which permits:

- the production of polymers and copolymers of acrylonitrile of properties constant in course of time, suitable for processing into fibers of improved mechanical, heat stability and color properties;
- a flexibility of the process enabling an easy variation of the quantity of polymer or copolymer produced without leading to any unbalance anywhere throughout the polymerization plant;
- an industrial production of very large polymer or copolymer quantities, without resorting to a plurality of polymerization or copolymerization lines, the quantities being in any case larger than those obtainable by a single production line in known polymerization or copolymerization processes;
- simplicity and economical convenience of the process.

The process according to this invention is essentially based on the recognition that in continuous polymerization or copolymerization of acrylonitrile in an aqueous medium with oxidation-reduction catalysts in two reaction steps in series, both physical and structural properties of the polymers obtained from the second step are largely independent of the polymerization or copolymerization period of the second step, provided that a relatively moderate monomer conversion is maintained at the first polymerization step.

Thus, the invention provides a continuous process for the polymerization of acrylonitrile monomer and copolymerization of a mixture of acrylonitrile monomer with further ethylenically unsaturated monomers copolymerizable therewith, in an aqueous medium in the presence of a catalytic redox system, through a primary and a secondary polymerization or copolymerization step characterized in that the primary polymerization step is carried out in a plurality of independent distinct reaction zones connected in parallel and operated under similar polymerization or copolymerization conditions, the conversion of the monomer or mixture of monomers in each of the primary zones being maintained at a value not exceeding 70%, the secondary step being carried out in a single reaction zone connected in series with each of the primary zones, the ratio of the residence period in the secondary zone to the residence period in each of the primary zones being from 0.1:1 to 5:1.

Finally, a secondary step conversion not exceeding 80% with respect to the overall feed of monomer or mixture of monomers to the primary step should advantageously be maintained; operating with conversion values of 65 to 75% with respect to the overall feed is preferred.

The minimum conversion value in each of the primary zones is not critical, although for reasons of economic convenience the value should conveniently not sink below about 30% with respect to the overall feed.

Advantageously, the ratio of the effective volume of each primary reaction zone to the effective volume of the secondary reaction zone is maintained from 0.1:1 to 5:1.

This ratio complies with the values of the ratios of the residence periods at the two steps, as defined hereinbefore. Best results are obtained with a ratio of the volumes of the order of 0.25:1 to 2:1.

The process of the invention can be applied to the polymerization of acrylonitrile as well as to the copolymerization of acrylonitrile with a wide range of ethylenically unsaturated copolymerizable compounds, such as vinyl acetate, methyl vinyl ketone, methyl acrylate, methyl methacrylate, dimethyl itaconate, butyl methacrylate, butyl acrylate, diethyl maleato, vinyl trimethyl acetate, methacrylonitrile, styrene, vinyl ethylhexyl ether, octyl methacrylate, alpha-methylstyrene, 4-methoxystyrene, ethylene sulfonic acid, allyl sulfonic acid, methallyl sulfonic acid, halogenated monoethylene compounds and N-vinyl compounds.

Two or more compounds can be copolymerized with acrylonitrile if desired.

The preferred copolymers are those containing acrylonitrile in a proportion of 85 to 95% by weight, methyl acrylate, vinyl acetate, styrene or methyl vinyl ketone in a proportion of 4 to 14% by weight and a copolymerizable sulfonate such as sodium, potassium styrene sulfonate, or sodium methallyl sulfonate in a proportion of 0.5 to 5% by weight.

According to the present invention, a preferred catalytic redox system comprises as oxidant a persulphate (preferably an alkali metal persulphate or ammonium persulphate), an organic peroxide (particularly benzoyl peroxide) or an alkali metal chlorate, and as reducing substance an inorganic compound containing a tetravalent sulphur atom, such as sulphur dioxide and alkali metal sulphites.

In these catalytic systems a molar ratio of the oxidant to the reducing substance of 0.01:1 to 0.5:1 is maintained.

A further catalytic system useful for the purposes of this invention comprises an alkali or ammonium persulphate, hydroxylamine mono- or disulfonate and a soluble iron salt, in which the molar ratios of persulphate to the hydroxylamine derivative and iron salt are of 0.1:1 to 10:1 and $10^2$:1 to $10^5$:1, respectively.

Preferably, the catalytic system is fed to each primary reaction zone in a proportion of 0.2 to 5 parts by weight to 100 parts by weight of the monomer or mixture of monomers fed to the zone.

Moreover, feeds are preferably so adjusted that the total concentration of the monomer or mixture of monomers and polymer or copolymer in each primary reaction zone is of 12 to 13% by weight in the polymerization medium.

The polymerization or copolymerization temperature can vary from 30° to 75° C, though a temperature of the order of 40°–65° C is preferred. The conversion of the monomer or mixture of monomers to the desired value in the primary zones depends upon the selected temperature, monomer concentration, catalyst concentration, etc. Generally, the primary polymerization or copolymerization step times are from 15 to 120 minutes.

According to an aspect of the invention the products discharged from the primary reaction zones are continuously fed to the secondary zone without any addition or make-up.

More particularly, polymerization or copolymerization conditions, such as temperature and pH, are preferably maintained in the secondary step equal or approximately equal to those of the primary step.

The residence time in the secondary step is linked to that in the primary step according to the relations mentioned hereinbefore and is at any rate such as to afford a convenient monomer conversion in the previously indicated range.

In particular, when the process of the invention is carried out with a constant residence time under primary step conditions, the residence time under the secondary step conditions may vary according to the number of primary zones employed.

The process of this invention utilizes at least two primary reaction zones, the maximum number being as large as desired though, generally, ten zones should conveniently not be exceeded.

In actual practice the primary step is carried out in reactors similar or approximately similar in volume fitted with stirrers and heat exchange means, in which similar reaction conditions are maintained.

To this end each primary reactor is fed with a similar or approximately similar stream of the constituents of the catalytic system, monomer or mixture of monomers and aqueous reaction medium.

Heat exchange is moreover adjusted in order to maintain in each primary reactor the same or about the same temperature.

The products discharged from the primary reactors are continuously fed to the secondary reaction zone connected in series with the reactors. The secondary reaction zone is provided by a single reactor fitted with stirring and heat exchange means.

The polymer or copolymer pulp continuously discharged from the secondary reactor is firstly submitted to treatments for recovery of the monomer or mixture of monomers and, possibly, of the catalyst (sulphur dioxide). Finally, the polymer or copolymer is separated, washed and dried.

Operation under the described conditions will lead to acrylonitrile polymers or copolymers, the properties of which do not vary when, other conditions being the same, the number of zones of primary step is varied. It thus becomes possible to vary the quantity of polymers or copolymers of acrylonitrile produced in a simple manner without leading to unbalances anywhere in the polymerization or copolymerization plant, simply by varying the number of primary zones. Morover, the above-described polymerization or copolymerization process makes possible an industrial production of large polymer or copolymer quantities without employing a plurality of independent lines.

The use of a single secondary reactor further leads to homogeneous polymerization or copolymerization products. Finally, operating according to the process of the invention yields polymers and copolymers of acrylonitrile of constant desired properties, more particularly suitable for processing into high-grade fibers.

EXAMPLE 1

Five copolymerization reactors are employed, lined with glass, each equipped with a stirrer and a heat exchange jacket. The capacity of the reactors (for primary copolymerization) amounts to 100 liters each, the capacity of the fifth reactor (for secondary copolymerization) amounts to 200 liters.

The four primary reactors are located at higher level than the fifth secondary reactor in order to transfer the copolymerization products from the primary reactors to the secondary one by overflow.

All reactors are filled with deionized water, the pH value being adjusted to 3 by addition of sulphuric acid. The temperature in each reactor is brought to 50°C and maintained at this level during subsequent copolymerization.

Each of the four primary reactors is fed with the following streams at the indicated speeds.

695 ml/min of a mixture containing 91 parts by weight acrylonitrile to 9 parts by weight vinyl acetate, 1350 ml/min of a solution obtained by dissolving 1.22 parts by weight sodium chlorate to 1000 parts by weight water, 1350 ml/min of a solution obtained by dissolving 5.45 parts by weight sodium hydroxide and 8.75 parts by weight sulphur dioxide to 1000 parts by weight water.

Each reactor is stirred and copolymerization starts about 30 seconds after the beginning of feeding. The residence time in each primary reactor is 30 minutes, in the secondary reactor 15 minutes, the overall period under copolymerization conditions being about 45 minutes.

About 180 minutes after the start, the system reaches its steady state conditions with a conversion of the monomers at the primary zones of 50%. The copolymer formed at the primary zones has a specific viscosity of 0.135, the determination of which being effected at 25°C in a solution containing 1 gram copolymer to 1 liter dimethylformamide.

The monomers conversion in the secondary copolymerization reactor is 65%, the copolymer having a specific viscosity of 0.138 measured in the above-mentioned manner.

Thus, 86.5 kg/hr copolymer are produced.

EXAMPLE 2

The procedure of Example 1 is followed, the streams being fed to two primary reactors only at the same rate as in the first example. In this manner the residence time in each of the primary reactors is 30 minutes and in the secondary reactor similarly 30 minutes, the overall copolymerization period amounting to 60 minutes. About 240 minutes after the start, the system reaches its working conditions. The progress at the primary copolymerization zones is similar to the one of the first example. The monomers conversion in the secondary polymerization reactor is 67%, the specific viscosity of the produced copolymer being 0.137 measured as in Example 1. Thus, 44.6 kg/hr

EXAMPLE 3

The procedure of Example 1 is followed, a stream being fed to a single primary reactor at the same rate as in the first example. In this manner the residence time in the primary reactor is 30 minutes and in the secondary reactor 60 minutes with an overall copolymerization period of 90 minutes. About 360 minutes after the beginning of copolymerization, the system is in its working conditions. The progress at the primary copolymerization stage is similar to that of the first Example. The monomers conversion in the second copolymerization reactor is 68%, the specific viscosity of the produced copolymer being 0.137 measured as in Example 1. Thus, 22.6 kg/hr copolymer are produced.

EXAMPLE 4

Nine copolymerization reactors are employed, lined with glass and each equipped with a stirrer and a heat exchange jacket.

The capacity of eight reactors (for primary copolymerization) amounts to 100 liters each, the capacity of the ninth reactor (for secondary copolymerization) amounts to 200 liters.

The eight primary reactors are located at higher level than the ninth secondary reactor in order to transfer the copolymerization products from the primary reactors to the secondary one by overflow. All reactors are filled with deionized water, the pH being adjusted to 3 by addition of sulphuric acid. The temperature in each reactor is brough to 50°C and maintained at this value during the following polymerization. Each of the eight primary reactors is fed with the following streams at the indicated rates:

340 ml/min of a mixture containing 92 parts by weight acrylonitrile to 8 parts by weight methyl acrylate;

660 ml/min of a solution obtained by dissolving 0.73 parts by weight sodium chlorate in 1,000 parts by weight water;

660 ml/min of a solution obtained by dissolving 8.3 parts by weight sodium hydroxide and 13.2 parts by weight sulphur dioxide in 1,000 parts by weight water.

Each reactor is stirred, copolymerization starting about 1 minute after the beginning of feeding. The residence time in each primary reactor is 60 minutes, in the secondary reactor 15 minutes, the overall copolymerization period amounting to 75 minutes. After about 300 minutes the system is in its working conditions, the monomers conversion at the primary step being about 54%. The copolymer obtained at this step has a specific viscosity of 0.130 measured as in Example 1. At the outlet of the secondary copolymerization reaction the monomers conversion results 71%, the specific copolymer viscosity being 0.136. Thus, 19.2 kg/hr copolymer are produced.

EXAMPLE 5

The procedure of Example 4 is followed, the streams being fed to four primary reactors only at the same rate as in the fourth example. The residence time in each of the primary reactors is 60 minutes, in the secondary one 30 minutes, the overall copolymerization period being of 90 minutes. About 360 minutes after the beginning of feeding, the system is in its working conditions. The progress at the primary copolymerization step is similar to the one of Example 4. The monomers conversion in the secondary copolymerization reactor is 72%, the produced copolymer having a specific viscosity of 0.137 measured as in Example 1. 16 kg/hr copolymer are produced.

EXAMPLE 6

The procedure of Example 4 is followed, the streams being fed to two primary reactors only at the same rate as in the fourth example. The residence time in each of the primary reactors is 60 minutes, in the secondary one likewise 60 minutes, the overall copolymerization period being 120 minutes. About 480 minutes after the beginning of feeding, the system is in its working conditions. The progress of copolymerization at the primary step is the same as in Example 4. The monomers conversion in the secondary reactor is 73%, the produced copolymer having a specific viscosity of 0.133 measured as in Example 1. 12.2 kg/hr copolymer are produced.

What we claim is:

1. A continuous process for polymerizing a monomer composition containing at least 85% by weight of acrylonitrile and up to 15% by weight of a further ethylenically unsaturated monomer copolymerizable therewith which comprises polymerizing the monomer composition in an aqueous medium at a temperature of from 30° to 75° C and in the presence of a catalytic redox system in first a primary and second a secondary polymerization stage, said primary stage comprising a plurality of independent primary reaction zones connected in parallel and operated under similar conditions such that the momoner conversion ranges from 30 to 70%, and said secondary stage comprising a single reaction zone connected in series with each of said independent reaction zones, the residence period for said monomer composition in said secondary polymerization stage to said primary polymerization stage being in the ratio of 0.1:1 to 5:1, said monomer conversion in said secondary reaction zone ranging from 65 to 80% of the monomer feed to said primary reaction zones.

2. The process of claim 1, wherein said primary polymerization stage consists of 2 to 10 reaction zones.

3. The process of claim 1, wherein said conversion value is from 65 to 75%.

4. The process of claim 1, wherein said catalytic system comprises a persulphate, an organic peroxide or an alkali metal chlorate as oxidant and an inorganic compound containing a tetravalent sulphur atom as a reducing substance, the molar ratio of said oxidant to said reducing substance being from 0.01:1 to 0.5:1.

5. The process of claim 1, wherein said catalytic system comprises an alkali metal or ammonium persulphate, a salt of a hydroxylamine sulfonic acid and a water-soluble iron salt, the molar ratio of the persulphate to the hydroxylamine sulfonic acid and iron salt being from 0.1:1 to 10:1 and $10^2$:1 to $10^5$:1, respectively.

6. The process of claim 1, wherein each of said primary reaction zones is supplied with said catalytic system in a proportion from 0.2 to 5 parts by weight to 100 parts by weight of said monomer or mixture of monomers to the said zone.

7. The process of claim 1, wherein an overall concentration of said monomer or mixture of monomers and polymer or copolymer from 12 to 30% by weight is maintained in the polymerization medium of said primary reaction zones.

8. The process of claim 1, wherein the said temperature ranges from 40° to 65°C.

9. The process of claim 1, wherein the duration of said primary step of polymerization is from 15 to 120 minutes.

10. A continuous process for polymerizing a monomer composition containing at least 85% by weight of acrylonitrile monomer and up to 15% by weight of a further ethylenically unsaturated monomer copolymerizable therewith in an aqueous medium and in the presence of a catalytic redox system a primary and a secondary polymerization step wherein the primary step is carried out in a plurality of independent distinct reaction zones connected in parallel and operated under similar conditions, each of said primary zones being supplied with the catalytic system in a proportion from 0.2 to 5 parts by weight to 100 parts by weight of the monomer or mixture of monomers delivered to the said zone, thereby polymerizing in the said first step for a period from 15 to 120 minutes at a temperature from 30° to 75° C the said monomer or mixture of monomers while maintaining a conversion value of the said monomer or mixture of monomers from 30 to 70% and an overall concentration of the monomer or mixture of monomers and polymer or copolymer from 12 to 30% by weight in the polymerization medium in each of said primary zones, and wherein the secondary step is carried out in a single reaction zone connected in series with each of the primary zones, the ratio of the residence time in the secondary zone to the residence time in the primary zones being from 0.1:1 to 5:1, thereby further polymerizing at a temperature from 30 to 75° C said monomer or mixture of monomers up to a maximum conversion of 80% with respect to the overall feed of said monomer or mixture of monomers to the primary zones.

11. The process of claim 10, wherein said catalytic system comprises an oxidant chosen in the group comprising persulphates, organic perioxides and alkali metal chlorates, and an inorganic compound containing a tetravalent sulphur atom as a reducing substance in a molar ratio of said oxidant to said reducing substance from 0.01:1 to 0.5:1.

12. The process of claim 10, wherein said catalytic system comprises an alkali metal or ammonium persulphate, a salt of hydroxylamine sulfonic acid and a water-soluble iron salt in molar ratio of the persulphate to the hydroxylamine sulfonate and iron salt from 0.1:1 to 10:1 and $10^2$:1 to $10^5$:1, respectively.

13. The process of claim 12, wherein the effective volume of each individual primary reaction zone to the effective volume of said secondary reaction zone is from 0.1:1 to 5:1.

14. The process of claim 13, wherein said volume ratio is maintained from 0.25:1 to 2:1.

* * * * *